(12) United States Patent
Lohberg et al.

(10) Patent No.: US 6,542,847 B1
(45) Date of Patent: Apr. 1, 2003

(54) SENSOR SYSTEM FOR DETECTING MOVEMENTS

(75) Inventors: Peter Lohberg, Friedrichsdorf (DE); Heinz Loreck, Idstein (DE); Wolfgang Fey, Niedernhausen (DE); Michael Zydek, Langgöns (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/646,692
(22) PCT Filed: Mar. 17, 1999
(86) PCT No.: PCT/EP99/01752
§ 371 (c)(1), (2), (4) Date: Dec. 20, 2000
(87) PCT Pub. No.: WO99/49322
PCT Pub. Date: Sep. 30, 1999

(30) Foreign Application Priority Data

Mar. 20, 1998 (DE) .......................................... 198 12 139

(51) Int. Cl.$^7$ .............................................. G06F 15/00
(52) U.S. Cl. ...................... 702/148; 702/150; 702/151; 702/145; 73/488; 73/495; 73/509; 324/166; 324/173; 324/207.25
(58) Field of Search .......................... 73/488, 495, 509; 324/166, 173, 207.25; 702/150, 151, 145, 148

(56) References Cited

U.S. PATENT DOCUMENTS 6,109,102 A * 8/2000 Schneider ..................... 73/488

FOREIGN PATENT DOCUMENTS

| DE | 44 34 977 | 4/1996 |
| DE | 196 18 867 | 2/1997 |
| DE | 196 21 902 | 12/1997 |
| DE | 196 34 715 | 3/1998 |
| DE | 196 50 935 | 6/1998 |
| DE | 198 11 095 | 9/1999 |
| EP | 0 569 924 | 11/1993 |
| WO | 98 09173 | 3/1998 |

* cited by examiner

Primary Examiner—John Barlow
Assistant Examiner—Stephen J. Cherry
(74) Attorney, Agent, or Firm—Rader, Fishman & Grauer PLLC

(57) ABSTRACT

The present invention describes a sensor assembly for detecting movements, wherein a sensor signal is produced in an active sensor (1) by an encoder (E) acted upon by the movement, and which includes a first device (2, 3, 4, 5) that permits converting the sensor signal, along with at least one additional information, into an output signal which can be transmitted to an evaluating device, and which is in particular characterized in that a second device (1a) is provided by which a signal voltage that depends on an air slot (d) between the active sensor (1) and the encoder (E) is detected and sent to the first device (2, 3, 4, 5) for transmission as additional information.

8 Claims, 3 Drawing Sheets

SENSOR SYSTEM FOR DETECTING MOVEMENTS

TECHNICAL FIELD

The present invention generally relates to electronic sensors and more particularly relates to an active sensor assembly for detecting movements.

BACKGROUND OF THE INVENTION

Sensor assemblies of this general type are disclosed, for example, in WO 98/09173 and are used especially for detecting the rotational behavior of a vehicle wheel (wheel speed sensors) in slip-controlled brakes or anti-lock systems. The rotational movement is executed by a pulse generator provided in the encoder (for example, a magnet pole wheel or a steel pinion gear) and detected by an active sensor, the pick-up for measuring data of which is for example a Hall element or a magnetoresistive bridge (AMR bridge) which responds synchronously in an effect-related fashion to modulations of the flux density or the field strength caused by the pulse generator. In the active sensor, the signal voltage produced thereby is converted by means of an amplifier/trigger circuit into a binary sensor signal with two constant amplitude values, the edge changes of which are evaluated to determine the rate of motion. Because the signal voltage depends on the size of the air slot between the sensor and the encoder, it must be ensured that the air slot will not exceed a defined air slot limit value.

In an active sensor, the sensor signal prevailing at the sensor output does not indicate the actual size of the air slot due to the internal amplifier/trigger circuit. Hence, the occurrence of errors or failures cannot be excluded if the air slot, at least temporarily, exceeds the air slot limit value due to unfavorable conditions of the sensor assembly (excessive installation air slot, major variations in temperature, vibrations) and the signal voltage drops below the internal trigger threshold.

An object of the present invention is to provide a sensor assembly of the type initially referred to wherein the size of the air slot between the active sensor and an encoder and especially unallowable variations of the air slot can be detected in order to be able to generate a corresponding status signal or take other precautionary measures in good time before a possible failure of the sensor signal.

This object is achieved according to the present invention in that there is provision of a second device by which a signal voltage that depends on an air slot between the active sensor and the encoder is detected and sent to the first device for transmission as additional information.

Especially in connection with the conversion of the binary sensor signal by means of the first device into a pulse signal, this solution permits relatively simply evaluating and determining or checking the size of the air slot. This may be carried out after the installation of the sensor assembly along with regular maintenance operations.

Accordingly, the first device preferably generates a pulse signal wherein the sensor signal is coded with first current pulses and the additional information is coded with second current pulses, wherein a first current level is provided for the first current pulses and a second current level for the second current pulses. In relation to a joint reference level, the first current level is in about twice as high as the second current level.

Further, the first device preferably comprises a signal processing device which permits transmitting further additional information in the form of status signals or numerical values which e.g. contain data about the direction of rotation, temperatures, etc.

DETAILED DESCRIPTION OF THE PREFERRED EMBODIMENTS

Figure 1:
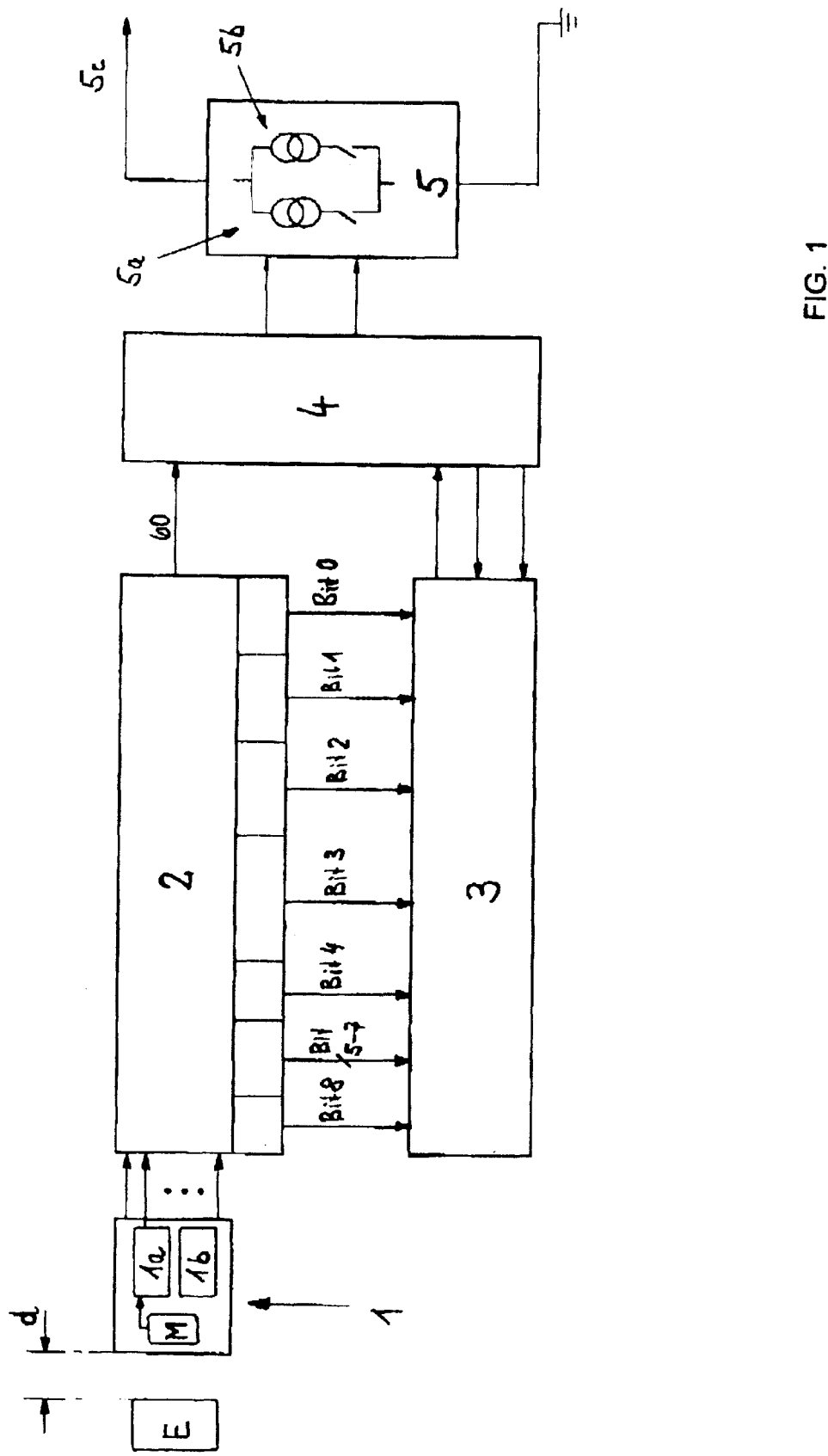
FIG. 1 is a wiring diagram of a sensor assembly of the present invention.

According to the embodiment of FIG. 1, the sensor assembly is comprised of an active sensor 1 in which a sensor signal is produced by an encoder E that is acted upon by a movement, the sensor signal along with a plurality of additional pieces of information being converted by a first device 2, 3, 4, 5 into an output signal 5c that can be transmitted to an evaluating device (not shown).

The encoder E comprises a pulse generator which executes the movement to be measured that is generally a rotational movement. As has already been explained hereinabove, the pulse generator includes, for example, a steel pinion gear or a permanent-magnetic structure, and a corresponding signal voltage is generated due to the movement thereof in a pick-up for measuring data M provided in the sensor (Hall element or magnetoresistive bridge). By way of an amplifier/trigger circuit (not shown) inside the sensor, this signal voltage is converted in a known fashion into a sensor signal 60 (FIG. 2) with two constant amplitude values.

To detect additional information, the active sensor 1 includes a second device 1a by which the signal voltage that is responsive to the air slot d between the active sensor 1 and the encoder E is measured, and a third device 1b which is used to measure the sensor temperature.

The outputs of the sensor 1 are connected to the inputs of a signal processing device 2. Further, there is provision of a slide register 3 whose inputs are applied to the outputs of the signal processing device 2. A state generator 4 which is connected to both the signal processing device 2 and the slide register 3 acts upon a downstream connected current source 5, to the output 5c of which the pulse signal being transmitted is applied.

The signal voltage measured, the quantity of which is responsive to the size of the instantaneous air slot d in relation to the encoder, is transmitted as an analog value to the signal processing device 2. There, the analog signal is digitized by 3-bit coding and converted into a bit sequence 40 (bits 5 to 7).

Also, the measured signal voltage is compared with a minimum value in the signal processing device, and a first 1-bit status signal (bit 0) is produced in the event that the signal voltage is lower than the minimum value.

The signal processing device 2 further comprises preferably a direction of rotation recognition means by which is produced a second 1-bit status signal (bit 4) for characterizing the direction of rotation, that means, a rotation of the encoder in one direction of reference or opposite thereto.

From the direction of rotation recognised, a third 1-bit status signal (bit 3) can be derived which indicates the validity of the direction of rotation.

Finally, a fourth status signal (bit 2) can be generated from the temperature measured by the third device 1b which indicates whether the temperature of the sensor assembly lies in an allowable range.

Another bit signal (bit 1) is reserved for further additional information, while bit 8 is a parity bit.

These bit-coded signals are transmitted as additional information by the signal processing device 2 parallel into the slide register 3, where they are intermediately stored. The signal voltage detected by the active sensor 1 which, in a known fashion, is converted into a binary periodic sensor signal 60 with two constant amplitude values is sent directly to the state generator 4.

Figure 2:
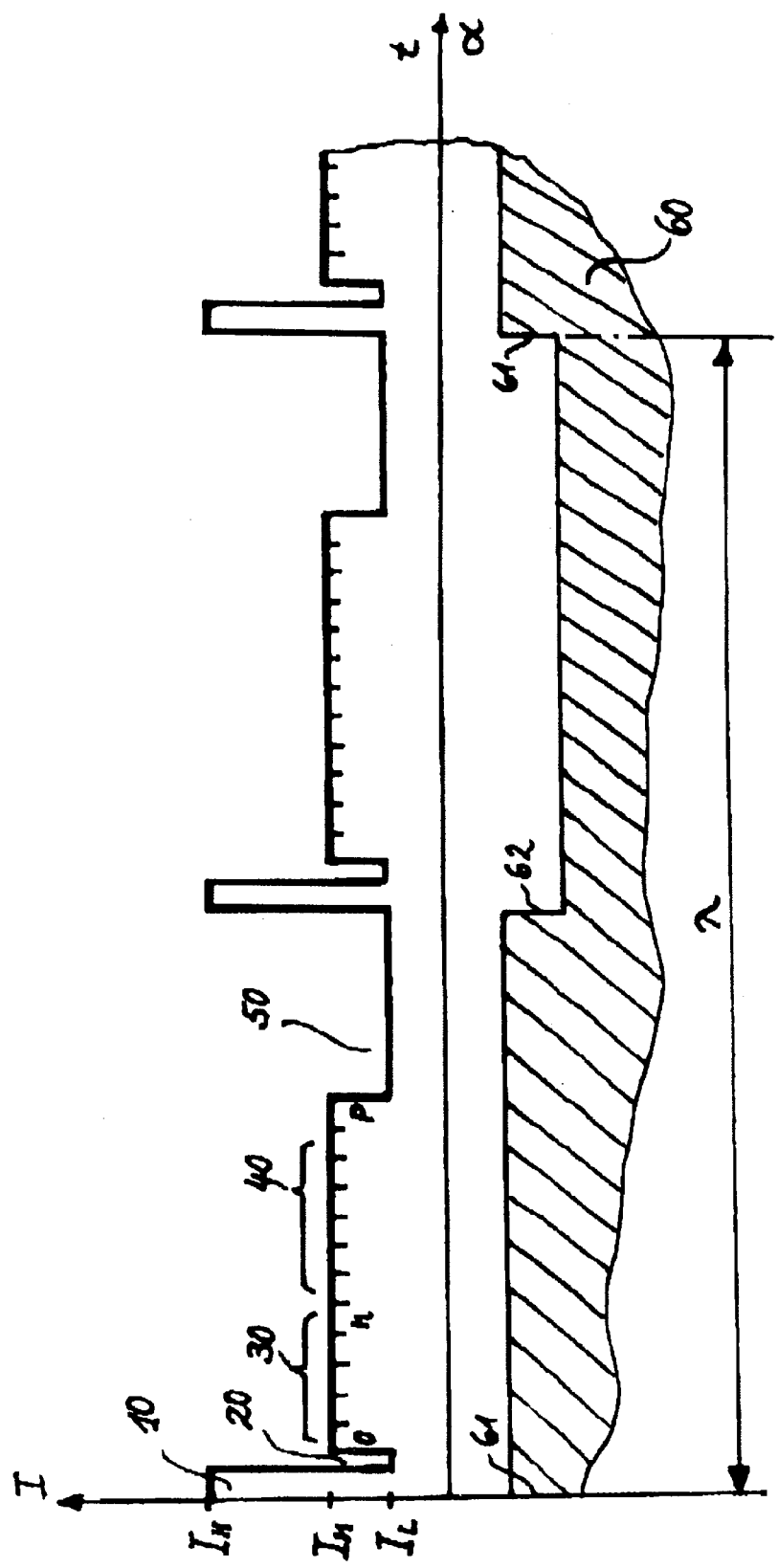
FIG. 2 shows the course of a pulse signal at the output of the sensor assembly.
Figure 3:
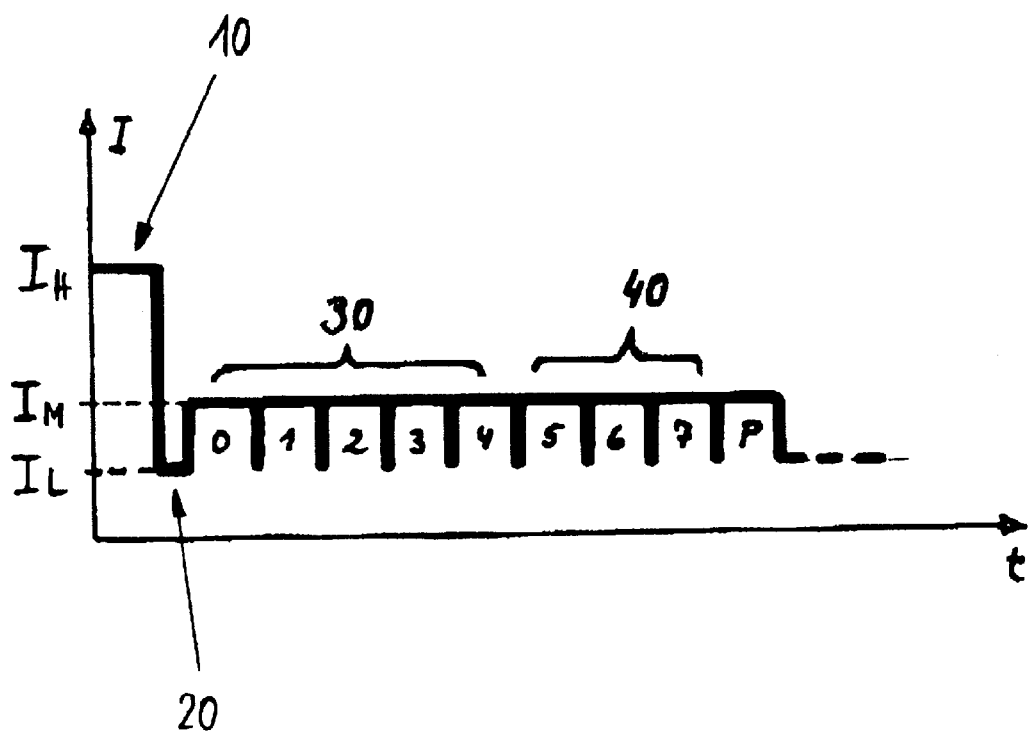
FIG. 3 shows the pulse signal in detail.

The state generator 4 actuates the current source 5 in such a manner that a pulse signal is applied to the output of the current source 5c which contains both the motion information (first current pulses $I_H$) and the additional information (second current pulses $I_M$) which are transmitted in the form of a data protocol illustrated in FIGS. 2 and 3.

To make a distinction between the different bit signals, the latter are preferably generated with three different current levels $I_L$, $I_M$, $I_H$, the nominal values of which have the following releationship: $I_M=2\times I_L$; $I_H=4\times I_L$. The different current levels may be produced by switch-over from different individual current sources 5a, 5b, or in any other manner.

Upon receipt of the sensor signal 60, the state generator 4 actuates the current source 5 so that at said's output 5c a first current pulse of the magnitude $I_H$ with a constant duration 10 is generated. The first current pulse serves for coding respectively one of edges 61, 62 of the sensor signal 60, the frequency thereof being the higher the greater the rotational speed or the rate of motion of the pulse generator in the encoder E is.

Following each first current pulse is a first pause interval of constant length 20, during which the current level is decreased to the reference level $I_L$.

Subsequently, the bit-coded signals (additional information) stored in the slide register 3 are serially read out and transmitted to the state generator 4. Generator 4 will then generate at output 5c of the current source 5 the second current pulses $I_M$ which form different bit sequences. A first bit sequence 30 comprises the current pulses (bits) 0 to n and serves for coding status signals according to the 1-from-n code so that one separate status information can be assigned to each individual bit.

In the FIG. 3 embodiment shown, the first bit sequence 30 comprises the bits 0 to 4 with the following assignment:

Bit 0 is a status signal for characterizing the exceeding of an allowable air slot limit value which is derived from the measurement of the signal voltage at the pick-up for measuring data and the resulting air slot field strength between the said pick-up and the pulse generator of the encoder. In the preferred application of the above described sensor assembly for detecting wheel rotational speeds, the allowable air slot limit value is considered as exceeded when the pick-up for measuring data 1a (magnetoresistive bridge or Hall element) of the active sensor 1 produces a signal voltage which drops below twice the hysteresis of the above-mentioned downstream-connected trigger circuit.

Bit 1 is reserved for additional applications.

Bit 2 represents a status signal for characterizing the exceeding of a limit value of an additional measured quantity (which limit value is independent of the wheel rotational speed) such as a temperature which is measured by means of the third device 1b.

Bit 3 is a status signal for confirming the validity of the direction of rotation of the pulse generator indicated by bit 4.

Finally, bit 4 is a status signal for the direction of rotation of the pulse generator with respect to a fixed reference direction of rotation.

A directly following second bit sequence 40 in its entirety serves for coding numerical values so that with bits (n+1) to (p−1) the measured values of analog signal magnitudes can be transmitted which are obtained from the (magnetic) interface between the pulse generator of the encoder E and the active sensor 1.

It principally applies that the length of the second bit sequence 40 is optional. Preferably, it may in total be used for transmitting one single analog value. On the other hand, it is also possible to transmit a combination of analog values at the same time, a defined number of bits and said's position in the second bit sequence 40 being associated with each analog value. The various analog values can also be combined with different codings.

In the preferred application, the second bit sequence 40 comprises three bits 5 to 7 which serve for the 3-bit coding of a numerical value representative of the air slot field strength that is detected by the pick-up for measuring data 1a of the active sensor, with the bits 5, 6, 7 having a rising order (LSB (=least significant bit)—MSB (=most significant bit)). This numerical value represents especially the signal voltage at the pick-up for measuring data 1a of the sensor.

Following the second bit sequence 40 is an individual parity bit p.

Subsequent is a second pause interval with the duration 50 and a current level of the magnitude $I_L$ (see FIG. 2). The duration depends on the rate of motion of the pulse generator and lasts until a new first current pulse $I_H$ appears, whereupon the pulse signal is transmitted again.

What is claimed is:

1. Sensor assembly, comprising:
    an active sensor for sensing a signal voltage and producing an analog signal in response to an air slot between said active sensor and an encoder;
    a signal processing device operatively connected to said active sensor for converting the analog signal to a digital signal having a bit sequence comprising an 8-bit word;
    a slide register operatively connected to said signal processing device for receiving and intermediately storing the digital signal from said signal processing device;
    a state generator operatively connected to said signal processing device and said slide register; and
    a current source operatively connected to said state generator for generating an output signal comprising a first current pulse representing motion information and a second current pulse representing additional information, the first and second current pulses separated by a first pause interval,
    wherein the second current pulse is comprised of an 8-bit sequence having four bits followed by three bits and a parity bit, the three bits representing a numerical value of a field strength of the air slot between the active sensor and the encoder.

2. Sensor assembly according to claim 1, wherein the first current pulse has a different amplitude than the second current pulse.

3. Sensor assembly according to claim 2, wherein the first current pulse has an amplitude that is twice an amplitude of the second current pulse.

4. Sensor assembly according to claim 1, wherein the four bits of the second current pulse comprises a first bit that is reserved, a second bit representing a temperature measured by the active sensor, a third bit representing whether a direction of rotation of the encoder is valid, and a fourth bit representing the direction of rotation of the encoder with respect to a reference direction of rotation.

5. Sensor assembly according to claim 1, wherein the second current pulse is followed by a second pulse interval.

6. Sensor assembly according to claim 1, wherein the signal processing device includes a comparator for comparing the signal voltage with a minimum value and for producing a first status signal when the signal voltage drops below the minimum value.

7. Sensor assembly according to claim 6, wherein the signal processing device includes means for recognizing a direction of rotation of the encoder and for producing a second status signal representing the direction of rotation of the encoder.

8. Sensor assembly according to claim 7, wherein the signal processing device produces a third status signal representing whether the direction of rotation of the encoder is valid.

* * * * *